United States Patent [19]

Ip

[11] Patent Number: 5,283,845
[45] Date of Patent: Feb. 1, 1994

[54] MULTI-PORT TUNABLE FIBER-OPTIC FILTER

[75] Inventor: Joseph W. Ip, Kanata, Canada
[73] Assignee: JDS Fitel Inc., Nepean, Canada
[21] Appl. No.: 915,249
[22] Filed: Jul. 20, 1992
[51] Int. Cl.[5] .......................... H01S 3/30; G02B 6/32
[52] U.S. Cl. ................................ 385/24; 372/6; 359/118
[58] Field of Search ............. 385/24, 31, 48, 73; 359/118, 92–94, 127; 372/6, 12

[56] References Cited

U.S. PATENT DOCUMENTS 4,680,767  7/1987  Hakimi et al. ..................... 372/6
4,813,756  3/1989  Frenkel et al. .................... 385/73

Primary Examiner—Akm E. Ullah
Attorney, Agent, or Firm—Sidney T. Jelly

[57] ABSTRACT

A multi-port tunable fiber-optic etalon filter (MTFET) having two spaced partially reflective mirrors, has three or more ports, with at least two on one side and at least one on the other side of the etalon. A single signal can be filtered with the reflected signal being received, forming a wavelength division multiplexor, or a plurality of signals can be filtered, with or without the reflected signals being received. A series of filters can be arranged in a cascade for sequential filtering a series of wave bands. A signal can be processed in two directions sequentially for a higher filter efficiency. A first signal can be monitored and controlled by a second signal. Various other arrangements can be provided. Integral optical processing functions can be incorporated, for example a blocking filter.

13 Claims, 3 Drawing Sheets

MULTI-PORT TUNABLE FIBER-OPTIC FILTER

This application relates to tunable fiber-optic filters. In particular the present invention is concerned with multi-port tunable fiber-optic filters comprising two partially reflective mirrors separated by a predetermined, and variable, gap and may be referred to as Fabry Perot, interferometric, or etalon filters. The term etalon will hereinafter be used in the description of filters of concern in the following.

An etalon filter, which is a bandpass filter, is a filter made up of two partially reflective mirrors, or surfaces, separated by a certain gap, forming a cavity. The spectral characteristics of an etalon filter are generally determined by the reflectivity and gap spacing (cavity length) of the mirrors or surfaces. Tuning of the center wavelength of the spectral passband of the etalon is achieved by varying the effective cavity length of the device. The effective cavity length may be varied by altering the actual physical gap size, or the refractive index of the gap medium, or both. The tuning mechanism may include piezo-electric actuators, liquid crystals, temperature, pressure, and other mechanisms.

A typical fiber-optic etalon filter consists of two optical fibers (ports) mounted on opposite sides of the etalon filters to couple the signal and transmitted optical beam into and out of the filter. Such a filter can therefore process only one input and one output beam at a time. To handle more than one input or output optical beam, a number of filters can be assembled, with each filter individually controlled.

The present invention differs from a conventional etalon filter, as so far manufactured and used, in that the total number of fiber ports is greater than two. These ports can be of any combination of input and output ports, with either single mode or multimode fibers. The ports can be used to couple transmitted and reflected optical power to and from the filter. Further, the angle of incidence of any of the optical beams is always greater than zero such that the return loss of each fiber port is higher than 20 dB. An additional feature is that it is possible to integrate other optical signal processing functions into the same structure to maximize efficiency.

A multiple port tunable fiber-optic etalon filter—hereafter referred to as MTFEF—is capable of processing more than one input or output optical beam to provide a wide arrangement of devices of various forms and usages.

Broadly, the invention provides a MTFEF comprising two partially reflective mirrors or surfaces separated by a tunable gap, and including at least three ports. The ports can comprise any desired formation of input and output ports. In one form of MTFEF there is one input port at one side of the fiber and an output port at the other side of the filter. A further output port is provided at the input side of the filter. The first output port handles the transmitted signal while the further output port handles the reflected signal.

Further forms of MTFEF's comprise a plurality of channels through a filter, and with the plurality of channels arranged for differing applications.

The invention will be readily understood by the following description of certain embodiments, by way of example, in conjunction with the accompanying drawings, in which.

Figure 1:
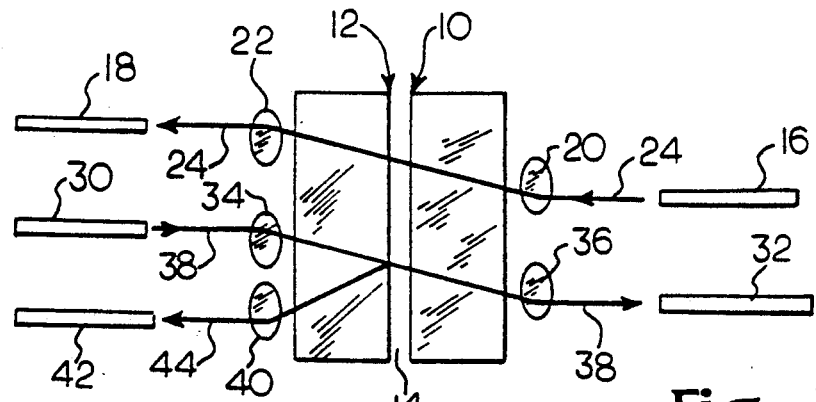
FIG. 1 illustrates diagrammatically a single MTFEF, with multiple ports.

FIG. 1 illustrates diagrammatically a single MTFEF with five ports. It comprises a single tunable etalon filter having two spaced partially transmitting, or partially reflecting, mirrors 10 and 12 separated by a gap 14. In the drawing a first pair of optical fibers, or ports, 16 and 18 are connected to the filter, through lenses 20 and 22 respectively, a light beam 24 being transmitted from fiber 16 via lens 20 through the mirrors 10 and 12, via lens 22 to fiber 18. On the passage through the filter certain wavelengths are passed through, while the remainder are rejected—or reflected.

Also in the drawing a further pair of fibers, or ports, 30 and 32 are connected via lenses 34 and 36 respectively, a light beam 38 being transmitted from fibers 30 via lens 34 through the mirrors 10 and 12, via lens 36 to fiber 32. Again, in this example, certain wavelengths are passed through, to fiber 32. The reflected, or rejected wavelengths are transmitted back from mirror 12 and a further lens 40 to a further fiber, or port, 42, at 44.

At the minimum a single MTFEF can comprise only the lower arrangement in FIG. 1, that is with three ports 30, 32, 42. As will be seen the optical beams, or rays, have a non-zero incidence angle at the etalon.

Figure 2:
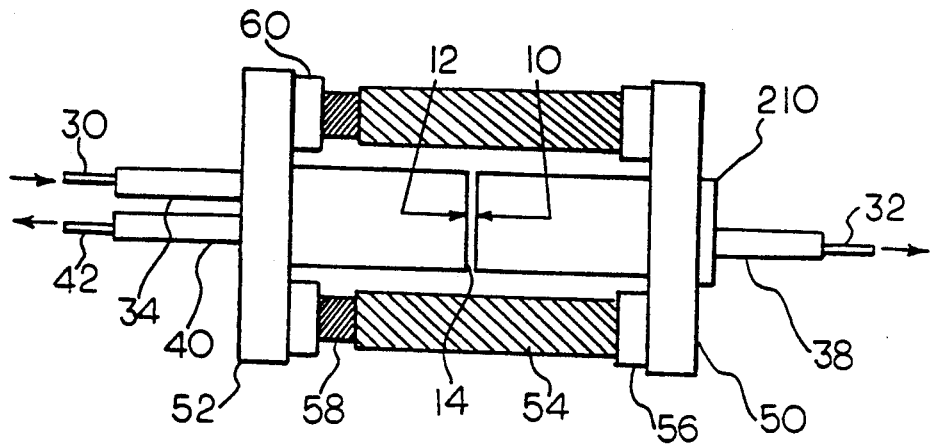
FIG. 2 illustrates, in cross-section, one form of three port device.

FIG. 2 illustrates in more detail one form of a MTFEF in which the etalon is shown with its constituent ports, for an arrangement as in the lower port of FIG. 1, common reference numerals being used where applicable.

In this example, the two mirrors 10 and 12 are formed at the inner ends of two elongate members 46, 48 which are each mounted on a glass end plate 50, 52. An annular or ring piezo actuator 54 extends between the end plates, being connected via a glass washer 56 at one end and via an annular aluminum split ring spacer 58 and a glass washer 60 at the other end. By varying the electric power applied to the piezo actuator, the axial length of the actuator can be varied, and thus the gap 14 varied.

In the arrangement of FIG. 2, one particular band of wavelengths can be caused to be transmitted to fiber 32, the remaining wavelengths reflected back to fiber 42.

Figure 3:
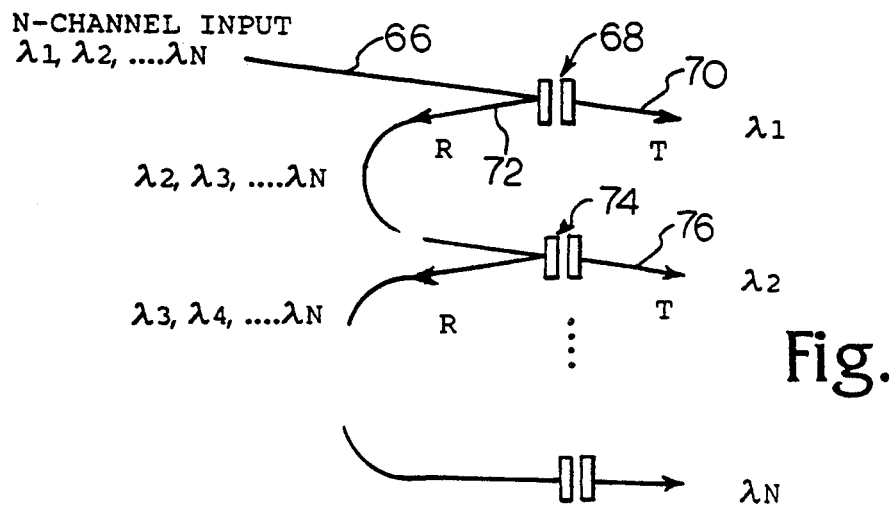
FIG. 3 illustrates one particular use of a device as in FIG. 2.

FIG. 3 illustrates a particular use of a MTFEF as in FIG. 2. A series of etalons are arranged in a cascade. A beam, or ray 66, having a plurality of wavelength channels, is fed to a first etalon 68, of the form as in FIG. 2. A first channel band λ1 is transmitted through to exit as beam 70. The reflected channels, 72, are fed to a further etalon 74 where a second channel band λ2 is transmitted through to exit as beam 76. This feeding of the reflected channels is repeated a number of times, according to the number of channels it is desired to obtain. Each etalon provides a particular desired channel to be transmitted through the filter.

Figure 4:
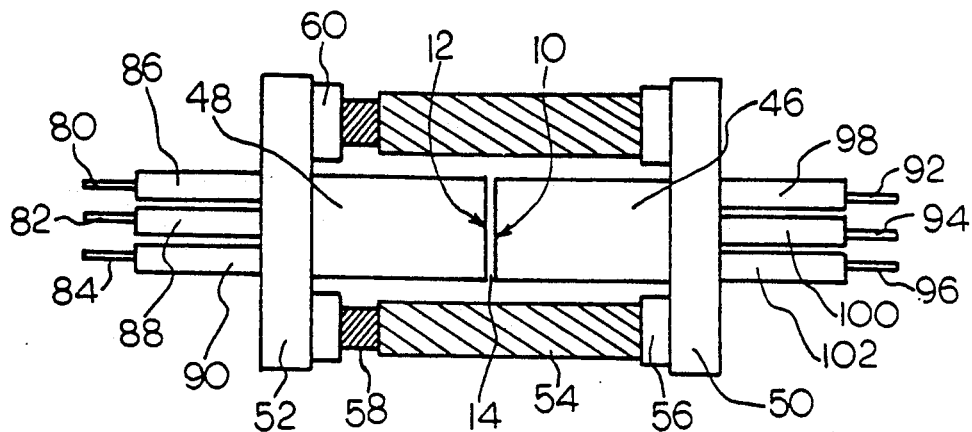
FIG. 4 illustrates, in cross-section as in FIG. 2, a device with three tracking channels.

FIG. 4 illustrates a multiple channel filter with three tracking channels, that is with six ports. In FIG. 4, there are three fibers, 80, 82, 84 at one side with lenses 86, 88 and 90 respectively. At the other side are three fibers 92, 94 and 96 with lenses 98, 100 and 102 respectively. Again the optical beams have a non-zero incidence angle.

Optical beams may propagate from fibers 80, 82 and 84 to fibers 92, 94 and 96, or in reverse, or the beams may propagate in one direction for one or two pairs of fibers and in the reverse direction in the other pair or pairs. A further alternative is for a beam to propagate in one direction for one pair of fibers, e.g., fibers 80 and 92, with the reflected beam exiting to a third fiber, e.g., 82, and a further beam propagating in the other direction from another pair of fibers, e.g., fibers 96, 84, the reflected beam exiting to the last fiber 94. It will be appreciated that as all of the beams are processed though the same gap, the same band of wavelengths will be passed through the filter for each beam.

Figure 5:
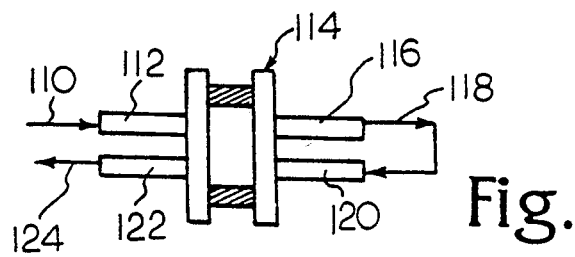
FIG. 5 illustrates diagrammatically a multi-channel device in a cascade form.

FIG. 5 illustrates diagrammatically an arrangement in which a beam is "filtered" twice. A fiber 110 feeds an optical beam, via lens 112, to an etalon 114. The transmitted wavelength band exits via lens 116 to fiber 118. The band is then fed back into the etalon via lens 120, the transmitted beam exiting via lens 122 to fiber 124. This provides a higher level of filtering.

Figure 6:
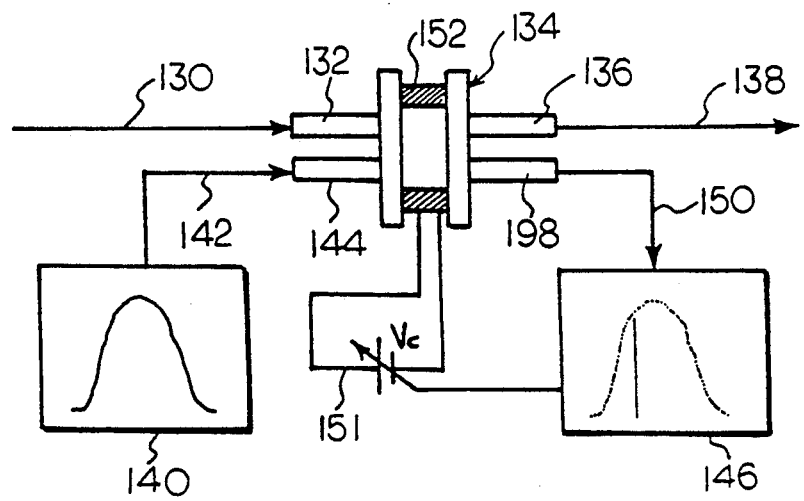
FIG. 6 illustrates a multi-channel device for monitoring and controlling one of the channels.

FIG. 6 illustrates an arrangement for monitoring and controlling a signal. The signal beam is fed via fiber 130 and lens 132 to an etalon 134. The filtered signal beam exits via lens 136 to fiber 138. A tracking signal from a known broadband source 140 is fed to the etalon via fiber 142 and lens 144. The filtered tracking signal is fed to a wavelength monitor 146 via lens 148 and fiber 150. The monitor detects the wavelength of the signal transmitted by the etalon and produces an error signal or feedback related to any difference between the monitored signal and a desired wavelength. The error signal is fed to a voltage driver circuit 151. The feedback circuit controls the piezo actuator 152 to tune the gap of the etalon to bring the transmitted signal and the monitored signal into alignment with the desired wavelength. While FIG. 6 shows the two signals going in the same direction through the filter, one can go in the opposite direction.

Figure 7:
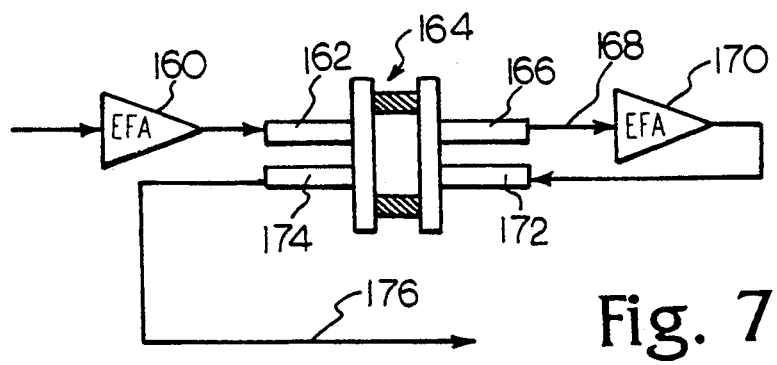
FIG. 7 illustrates a multi-channel device for noise filtering in a two-stage optical amplifying system.

FIG. 7 illustrates an arrangement for noise filtering with a two-stage optical amplification system. The input optical signal is fed via an EFA (erbium fiber amplifier) 160 and lens 162 to an etalon 164. The filtered signal exits via lens 166 to a fiber 168. The signal is then fed to a second EFA 170 and then back through the etalon via lens 172, exiting via lens 174 to output fiber 176. The first etalon channel (162–166) between the two EFA's prevents the saturation of the second EFA 170 by the Amplified Spontaneous Emission (ASE) from the first EFA 160. The second etalon channel (172–174) acts as an output noise filter. In a conventional design, two separate fiber etalon filters with two control loops are required.

Figure 8:
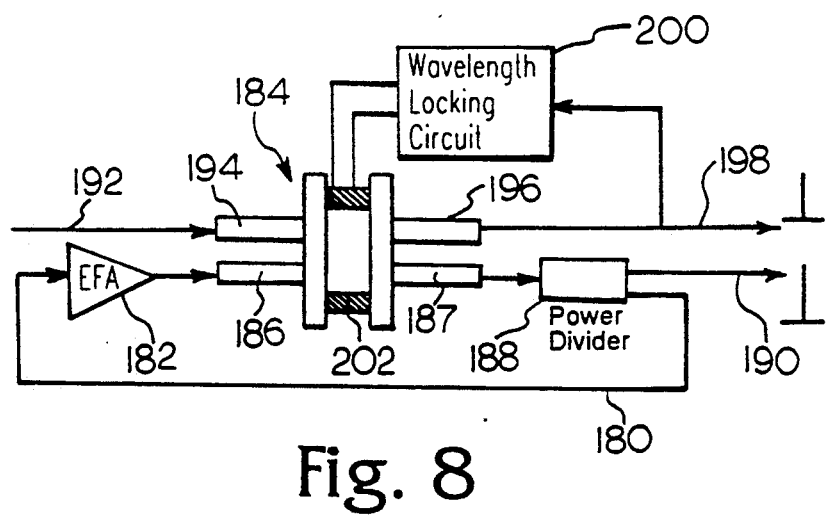
FIG. 8 illustrates a multi-channel device for locking the output from a fiber ring-laser to another source.

FIG. 8 illustrates an arrangement for wavelength locking of output from a fiber ring-laser to an external source. The fiber ring-laser 180, with an EFA 182, feeds to an etalon 184, via lens 186, the output signal from the etalon being fed via port 187 to a power divider 188. Part of the output exits via fiber 190 for use, and the remainder remains in the ring-laser. An external source beam is fed to the etalon via fiber 192 and lens 194, the filtered beam exiting via lens 196 and fiber 198. The filtered beam is connected to a wavelength locking circuit 200 which monitors the filtered signal at 198 and actuates the piezo actuator 202 of the etalon to tune the transmitted wavelength of the etalon to that of the external source, which in turn maintains the wavelength of the ring-laser at the same value as the wavelength of the transmitted external source beam. Again, in this example, the external source beam could be in the reverse direction.

A MTFEF may integrate other optical signal processing functions into the same structure to maximize efficiency. For example, a broad band or blocking filter may be incorporated to restrict the spectral range transmitted. As an example, a blocking filter can be incorporated in an arrangement as in FIG. 2, as indicated at 210. The filter can alternatively be at the input port 34.

While, in the examples described, and illustrated, the effective gap between the mirrors has been varied by physically moving one, or both, of the mirrors, as by a piezo actuator, the effective gap, or cavity can be varied by other means. For example, the gap can be filled by a liquid crystal, the refractive index of which is varied to produce an effective change in the cavity.

What is claimed is:

1. A multi-port tunable fiber-optic etalon filter comprising:
   a single etalon having two partially reflective mirrors, mounted in parallel spaced-apart relationship to form a gap between the mirrors;
   means for varying the effective gap between said mirrors; and
   at least three fiber ports optically coupled to said etalon filter, at least two ports connected to one mirror and at least one port connected to the other mirror; the ports positioned such that optical beams extending through the filter having a non-zero incidence angle.

2. A filter as claimed in claim 1, said mirrors mounted on support means axially aligned, and said means for varying said effective gap comprises an annular piezo actuator surrounding said mirrors and acting to move said support means to vary said gap.

3. A filter as claimed in claim 1, including an integral optical processing function at a port.

4. A filter as claimed in claim 3, said optical processing function comprising a blocking filter.

5. A filter as claimed in claim 4, said blocking filter positioned at an output port for a filtered signal.

6. A filter as claimed in claim 1, including three ports, two ports at one side and one port at the other side, said two ports comprising an input port for an input signal and an output port for a reflected signal, and said port at said other side comprising an output port for a filtered signal.

7. A filter arrangement comprising a plurality of filters as claimed in claim 6, arranged in cascade, including means for connecting said output port at each of said other sides to said input port at said one side of a sequential filter, each filter passing a different wave band.

8. A filter as claimed in claim 1, including multiple ports at each side.

9. A filter as claimed in claim 1, said ports comprising an input at one side, an output at the other side for a filtered signal and an output at said one side for a reflected signal, and further comprising an input at one of said one side and said other side, a second output at the other of said one side and said other side for a filtered signal, and a second output at said one of said one side and said other side for a reflected signal.

10. A filter as claimed in claim 8, including an input at one side and an output at the other side for a filtered signal, an input at said other side and an output at said one side and transmission means connecting said output at said other side to said input at said other side said output at said one side receiving a filtered signal after a second passage through the filter.

11. A filter as claimed in claim 8, including, means for feeding a first signal to a first input at one side and an output at the other side for receiving a filtered first signal, means for feeding a second signal of a known wavelength band to a second input at one of said one side and said second side and a second output at said other side and said one side of the other for receiving a filtered second signal; a wavelength monitor and feedback circuit, and means for feeding said filtered second signal to said wavelength monitor, said feedback circuit producing a signal to control said effective gap and maintain said filtered first signal at a desired wavelength.

12. A filter as claimed in claim 8, including a first fiber amplifier, means for feeding a signal to said first amplifier and out from said amplifier to an input at one side, an output at the other side for receiving a filtered signal, a second fiber amplifier and means for feeding said filtered signal from said output to said second amplifier and from said second amplifier to an input at said other side, and an output at said one side for receiving a filtered signal after a second passage through the filter.

13. A filter as claimed in claim 8, including a fiber ring-laser comprising an input at one side and an output at the other side, a power divider, means for feeding a filtered signal from said output to said power divider, means for feeding a divided out portion of said signal from said power divider to provide a laser output, and means for feeding a remainder of said signal from said power divider to said input, through a fiber amplifier; and further including a further input at one of said one side and said other side for an internal source signal and a further output at the other of said other side and said one side for receiving a filtered external source signal; a wavelength locking circuit, and means for connecting said further output to said wavelength locking circuit, said wavelength locking circuit adapted to produce a control signal, related to said filtered external source signal, and means for feeding the control signal to said means for varying the effective gap to tune the transmitted wavelength to that of the external source, to maintain the filtered wavelength of the said fiber ring-laser, the same as that of the external source.

* * * * *